Aug. 25, 1942.    E. FAERBER    2,293,724
METHOD OF TREATING WASTE MATERIAL OF WOOD SUGAR PROCESSES OR THE LIKE
Filed July 8, 1937
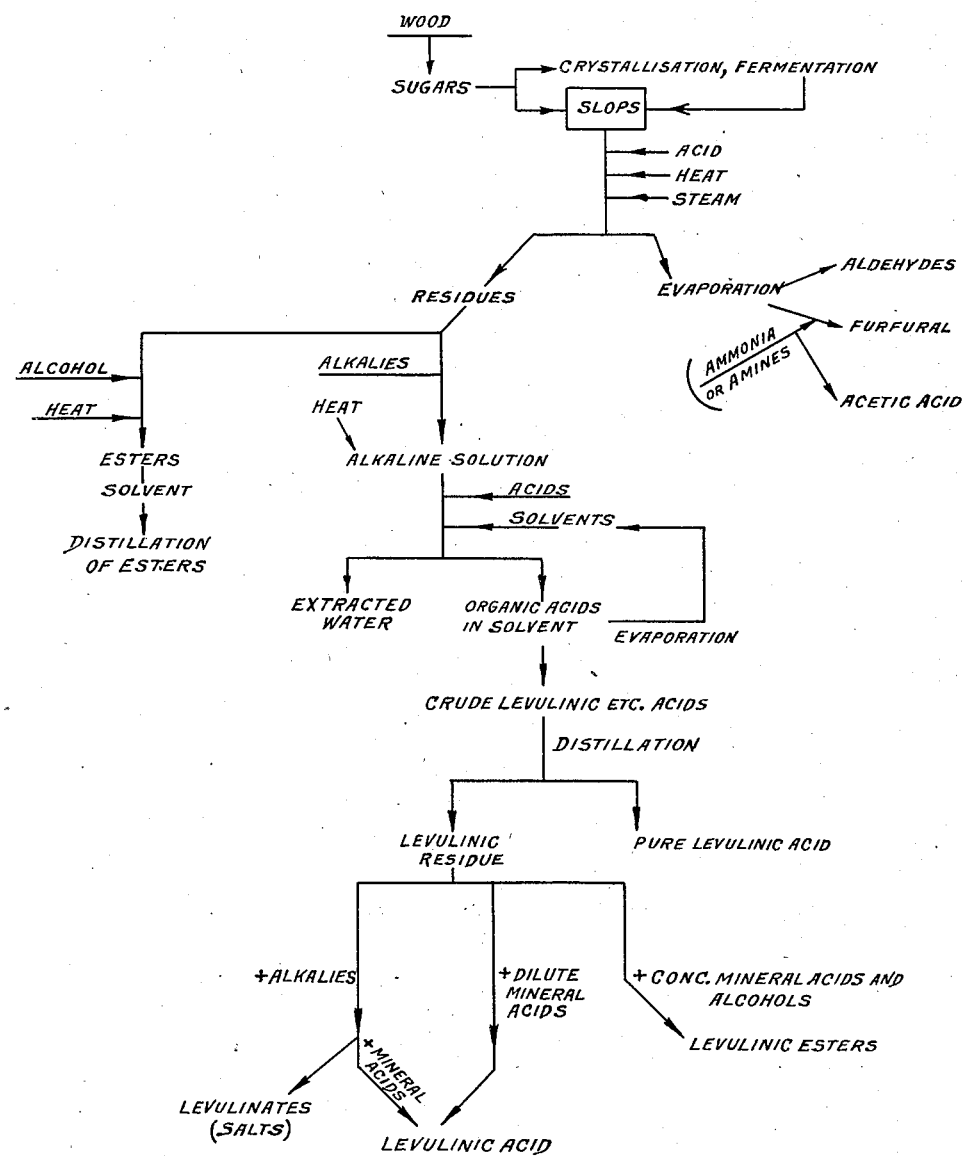
WITNESS
INVENTOR
EDUARD FAERBER
BY
ATTORNEYS Patented Aug. 25, 1942

2,293,724

UNITED STATES PATENT OFFICE 2,293,724

METHOD OF TREATING WASTE MATERIAL OF WOOD SUGAR PROCESSES OR THE LIKE

Eduard Faerber, Heidelberg, Germany

Application July 8, 1937, Serial No. 152,519
In Germany May 2, 1935

16 Claims. (Cl. 260—483)

This invention relates to the treatment of waste material such as slops from the so-called wood sugar process for the recovery therefrom of commercially valuable substances such as furfural and levulinic acid or its esters.

In the art of producing wood sugars as heretofore practiced and described in literature mainly by Dr. Friedrich Bergius, cellulosic substances such as wood are subjected to acidic hydrolysis resulting from treatment with preferably strong hydrochloric acid (or sulfuric acid). As a result of this hydrolysis polysaccharides are formed including pentoses and hexoses, the latter being either crystallized out or fermented to alcohol by means of yeast. Sometimes it is easier to crystallize only a part of these sugars and to use the remaining part for the production of yeast and alcohol. The mother liquors from the crystallization or wort from the fermentation contains unfermentable pentoses and hexoses for example of the galactose variety or reverted forms of hexoses fermentable in the monomeric state. By returning wort with fresh sugar to the fermentation, the unfermentable sugars are enriched in the wort. The spent solution ordinarily termed "slops" is waste and heretofore no chemical use has been found for it.

I have now discovered that the spent solution, which may be regarded as "wood sugar wort" and which is of complex composition, is so constituted and sufficiently rich in material capable of use for the production of valuable end products such as furfural and levulinic acid or esters. Apparently what occurs in this connection is that the pentoses are transformed into furfural and the hexoses mainly into organic acids.

It is a well-known fact that when aqueous solutions of pentoses are heated in the presence of mineral acid they can be transformed into furfural, but it was by no means apparent or foreseeable that such treatment would be effective at all or sufficiently effective to produce any valuable results if it was attempted to be applied to a complex mixture such as the slops of the wood sugar process or even to the pentoses in the condition and in the environment in which they exist in these slops. When, however, the wood sugar wort is heated directly with strong mineral acid having a light degree of dissociation such as HCl or H2SO4 and the resultant volatile products removed, it becomes possible by fractional distillation to separate the product into aliphatic aldehydes, furfural, and acetic acid. Very concentrated vapors can be obtained by first evaporating the wort until a concentration of about 20% of carbohydrate is reached and the wort is then heated in the presence of 2 to 3% of hydrochloric acid (HCl) or sulfuric acid (H2SO4) with occasional additions of steam. Concentrated furfural distillates can, however, be obtained also from more dilute solutions if the transformation of the pentoses is carried through above the boiling point under pressure and distillation takes place slowly according to the velocity of the formation of the furfural.

Furfural produced in this way is unstable. It darkens after a short time and with liberation of water resinous products are gradually formed. The stability of the furfural can, however, be greatly increased by the addition of very small quantities of ammonia or aliphatic amines during distillation or rectification. It is sufficient, for instance, to add one part of triethanolamine to 10,000 parts of furfural to obtain, in distilling this mixture, pure furfural which keeps its light yellow color for a long time and remains transparent for months.

The presence of hexoses and other accompanying substances which from the standpoint of the production of furfural may be regarded as contaminations of wood sugar wort hinders a continuous production of furfural. A comparatively large quantity of insoluble substances is separated, and not only prevents the flow of the liquid but also decreases the yield of furfural and of the organic acids produced from the hexoses.

These difficulties can be avoided if the heated acid wort is made alkaline after distilling off the furfural and heating is continued at alkaline reaction. The insolubles are thereby dissolved and for the most part transformed into organic acids of low molecular weight, mainly levulinic and lactic acids the same as are formed during the first period of the process. These products are extracted from the solution after reacidification by addition of mineral acids, for example, sulfuric acid. A comparatively small increase of concentration of the levulinic acid in water results in a surprisingly great increase of extractability by means of organic solvents. For example, in mixing five parts of an aqueous 3% levulinic acid solution with one part of tetrachlorethane, a 1.5% levulinic acid solution is obtained while with 6% levulinic acid in the wood sugar solution to be extracted a 12% levulinic acid solution is obtained in the tetrachlorethane.

The production of levulinic esters is correspondingly easy after a preliminary concentration. It is not difficult to produce the esters out of the aqueous preconcentrated solution of levulinic acid by heating, for instance, with methyl or ethylalcohol and accordingly the levulinic acid can be conveniently extracted by way of its esters. The esters can be quite completely extracted, for example, by means of tetrachlorethane or benzol and purified by distillation after removal of the solvent for the recovery of the esters.

In the purification of levulinic acid by fractional distillation of a crude acid, resinous products are formed. For example, when distilling 100 parts of an extract, 60 to 70 parts of levulinic acid and 40 to 30 parts of residue are obtained. This residue yields only high boiling distillates in small percentages and is practically insoluble in water. It was found, however, that these residues can be made to yield considerable quantities of levulinic acid either as such or in the form of its compounds. One available method is to heat the residue of the distillation in the presence of alkalis, for example, by heating with more or less concentrated hydrate of sodium or calcium-hydroxide in water. By this treatment a considerable part of the dark organic substance is dissolved and only little insoluble, resinous substance remains. If the aqueous solution is then decomposed with sufficient mineral acid to set free the organic acids and evaporated, substantially pure levulinic acid can be obtained. Under the stated circumstances the additional quantity of levulinic acid may amount to 15 to 20 parts so that the yield from 100 parts of extract may rise up to 90 parts. The resinous residues formed during the distillation of the levulinic acid ("levulinic residue") are specially suited also for the production of esters for if these products which contain no free levulinic acid are heated with very small amounts of concentrated mineral acids, such as phosphoric acid or sulfuric acid and an alcohol, considerable quantities of levulinic esters are formed. If the distillation residues are treated with dilute acids, it is possible by prolonged heating to produce free levulinic acid which, after the mineral acid has been removed, can be isolated in the described manner.

In the accompanying drawing the procedure which is employed is indicated by way of a diagrammatic flow sheet. It sets forth the succession of operations from wood to levulinic residue and the successive operations applied to this residue. No separate description of the drawing is believed to be necessary.

The method described herein can be applied to the wood sugar wort at any stage of its existence and not merely at the point where the wort has arrived at the condition of the usual slops. Inasmuch, however, as the wood sugar process aims at the extraction of valuable sugars, it is not unlikely that the practical utilization of my new process will usually begin after the wood sugars have been extracted from the wort and the wort has arrived at the state where from the standpoint of the wood sugar process it has become the waste slops of that process.

That part of the procedure described in this specification and which deals with the treatment of the residues of the distillation of furfural can also be conveniently made use of in the treatment of the waste or residue of plants in which furfural is produced from oat hulls, corn cobs, or the like.

I claim:

1. The method of utilizing the residual wort or slops resulting from the fermentation of the sugar solution obtained by the acid hydrolysis of wood, comprising concentrating the wort or slops, adding thereto a strong mineral acid, heating the mixture and expelling at least part of the more volatile material therefrom, adding an excess of an alkaline substance to the residue, heating the alkaline mixture, acidifying the same, separating the organic acids including levulinic acid from the mixture, and distilling the acid mass to separate levulinic acid.

2. The method according to claim 1, wherein the residue of the levulinic acid distillation is reacted with a mineral acid and levulinic acid recovered from the reaction product.

3. The method according to claim 1 wherein the residue of the levulinic acid distillation is reacted with a mineral acid and alcohol and the levulinic acid ester recovered from the reaction product.

4. In a method for the manufacture of levulinic acid and its compounds, the steps which comprise adding an alkaline material to the water-insoluble, non-acid residue of an acid treatment of carbohydrate material, and heating the residue in the alkaline condition until levulinic acid is split off from the residue in the form of its salt.

5. In a method for the manufacture of levulinic acid and its compounds, the steps which comprise adding alkali to the water-insoluble, non-acid residue of an acid treatment of carbohydrate material, heating the residue in the alkaline condition until levulinic acid is split off from the residue in the form of its salt, acidifying the solution, and recovering the free levulinic acid.

6. In a method for the manufacture of levulinic acid and its compounds, the steps which comprise adding alkali to the water-insoluble, non-acid residue of an acid treatment of carbohydrate material, heating the residue in the alkaline condition until levulinic acid is split off from the residue in the form of its salt, acidifying the solution, extracting the solution with the aid of a water-immiscible organic solvent for levulinic acid, and then evaporating the solvent.

7. In a method for the manufacture of levulinic acid and its compounds, the steps which comprise adding alkali to the residue of an acid extraction of cellulosic material, heating the residue in the alkaline condition until the salt of levulinic acid is produced, acidifying the mass, extracting levulinic acid with the aid of an organic solvent, expelling the solvent, and then distilling the levulinic acid in the residue so obtained.

8. In a method for the manufacture of levulinic acid and its compounds, the steps which comprise adding alkali to the residue of an acid extraction of cellulosic material, heating the residue in the alkaline condition until the salt of levulinic acid is produced, acidifying the mass, extracting levulinic acid with the aid of an organic solvent, distilling the levulinic acid from the extract and treating the resulting residue with an alkaline substance.

9. The method of utilizing the residue of an acid extraction of cellulosic material remaining after the separation of the sugar component, which comprises concentrating the residue, treating the same with an alkali, acidifying the solution, extracting the same with a water-immiscible solvent for levulinic acid, and recovering levulinic acid from the extract.

10. The method of utilizing the residue of an acid extraction of cellulosic material from which the more volatile components have been distilled off, comprising adding alkali to the residue until it is alkaline, acidifying the solution, extracting organic acids including levulinic acid with a water-immiscible solvent, distilling the acids, treating the residue from the distilled acids with a small quantity of mineral acid in the presence of an alcohol, and distilling the thus-formed ester.

11. The method of utilizing the residue of an acid extraction of cellulosic material, comprising adding alkali to the residue until it is alkaline, heating the mixture, acidifying the solution, extracting levulinic acid with the aid of a water-immiscible solvent, distilling off the levulinic acid, treating the residue from the distilled levulinic acid with a small quantity of concentrated mineral acid in the presence of an alcohol, and distilling the thus-formed ester.

12. The method of utilizing the residue remaining after the heating of the residual wort or slops, resulting from the fermentation of the sugar solution obtained by the acid hydrolysis of wood, with a strong mineral acid and the expulsion of at least part of the more volatile material therefrom, comprising subjecting such residue to treatment with alkali, heating the mass in the alkaline condition, acidifying the mass, extracting levulinic acid therefrom with the aid of a water-immiscible organic solvent, distilling the levulinic acid mixture so extracted, treating the residue from the distilled levulinic acid with small quantities of concentrated mineral acid in the presence of an alcohol capable of forming an ester with the levulinic acid, and distilling the thus-formed ester.

13. The method of utilizing the residue remaining after the heating of the residual wort or slops, resulting from the fermentation of the sugar solution obtained by the acid hydrolysis of wood, with a strong mineral acid and evaporation of at least part of the more volatile material therefrom, which comprises subjecting such residue to treatment with alkali, heating the mass in the alkaline condition, acidifying the mass, extracting therefrom levulinic acid with the aid of a water-immiscible organic solvent, distilling the levulinic acid mixture so obtained, treating the resulting residue with alkali, acidifying the solution, and recovering the liberated levulinic acid.

14. The method for the recovery of valuable by-products from the residue remaining after the heating of the concentrated wort or slops of wood sugar manufacture, resulting from the fermentation of the wood sugar, with a mineral acid, and evaporation of at least part of the more volatile material therefrom, which comprises subjecting such residue to treatment with alkali, heating the mixture in alkaline condition, acidifying the same, and extracting levulinic acid with the aid of a water-immiscible organic solvent.

15. The method for the recovery of valuable by-products from the residue remaining after the heating of the concentrated wort or slops of wood sugar manufacture, resulting from the fermentation of the wood sugar, with a mineral acid, and evaporation of at least part of the more volatile material therefrom, which comprises subjecting such residue to treatment with alkali, heating the mixture in alkaline condition, acidifying the mass, extracting levulinic acid with the aid of a water-immiscible organic solvent, distilling the levulinic acid mixture so obtained, and hydrolyzing the residue of such distillation to recover further quantities of levulinic acid.

16. The method set forth in claim 15 in which the hydrolysis is effected by the addition of alkali.

EDUARD FAERBER.